United States Patent
Abrash et al.

(10) Patent No.: US 12,065,170 B2
(45) Date of Patent: Aug. 20, 2024

(54) AUTOMATED DRIVING SYSTEMS AND CONTROL LOGIC FOR LANE LOCALIZATION OF TARGET OBJECTS IN MAPPED ENVIRONMENTS

(71) Applicant: GM GLOBAL TECHNOLOGY OPERATIONS LLC, Detroit, MI (US)

(72) Inventors: Joseph R. Abrash, Bloomfield Hills, MI (US); Paul A. Adam, Milford, MI (US); Robert C. Baraszu, Livonia, MI (US); Dmitriy Feldman, West Bloomfield, MI (US); Yadollah Sabri, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 401 days.

(21) Appl. No.: 17/487,261

(22) Filed: Sep. 28, 2021

(65) Prior Publication Data
US 2023/0103248 A1    Mar. 30, 2023

(51) Int. Cl.
*B60W 60/00* (2020.01)
*B60W 10/04* (2006.01)
(Continued)

(52) U.S. Cl.
CPC ........ *B60W 60/0027* (2020.02); *B60W 10/04* (2013.01); *B60W 10/18* (2013.01);
(Continued)

(58) Field of Classification Search
CPC ...... B60W 10/04; B60W 10/18; B60W 10/20; B60W 2050/0052; B60W 2554/4041;
(Continued)

(56) References Cited

U.S. PATENT DOCUMENTS

| | | |
|---|---|---|
| 6,356,838 B1 | 3/2002 | Paul |
| 6,427,119 B1 | 7/2002 | Stefan et al. |

(Continued)

FOREIGN PATENT DOCUMENTS

| | | | | |
|---|---|---|---|---|
| CN | 113460042 A | * | 10/2021 | ............ B60W 30/08 |
| CN | 110967026 B | * | 2/2022 | ............ G01C 21/32 |

(Continued)

*Primary Examiner* — Babar Sarwar
(74) *Attorney, Agent, or Firm* — Quinn IP Law (57) ABSTRACT

A method for controlling operation of a motor vehicle includes an electronic controller receiving, e.g., from a vehicle-mounted sensor array, sensor data with dynamics information for a target vehicle and, using the received sensor data, predicting a lane assignment for the target vehicle on a road segment proximate the host vehicle. The electronic controller also receives map data with roadway information for the road segment; the controller fuses the sensor and map data to construct a polynomial overlay for a host lane of the road segment across which travels the host vehicle. A piecewise linearized road map of the host lane is constructed and combined with the predicted lane assignment and polynomial overlay to calculate a lane assignment for the target vehicle. The controller then transmits one or more command signals to a resident vehicle system to execute one or more control operations using the target vehicle's calculated lane assignment.

20 Claims, 3 Drawing Sheets

(51) Int. Cl.
*B60W 10/18* (2012.01)
*B60W 10/20* (2006.01)
*B60W 50/00* (2006.01)
*G01C 21/32* (2006.01)

(52) U.S. Cl.
CPC ........ *B60W 10/20* (2013.01); *B60W 50/0098* (2013.01); *G01C 21/32* (2013.01); *B60W 2050/0052* (2013.01); *B60W 2554/4041* (2020.02); *B60W 2554/4042* (2020.02); *B60W 2554/4043* (2020.02); *B60W 2554/801* (2020.02); *B60W 2554/802* (2020.02); *B60W 2556/50* (2020.02); *B60W 2710/18* (2013.01); *B60W 2710/20* (2013.01); *B60W 2720/106* (2013.01); *B60W 2720/125* (2013.01)

(58) Field of Classification Search
CPC . B60W 2554/4042; B60W 2554/4043; B60W 2554/801; B60W 2554/802; B60W 2556/50; B60W 2556/60; B60W 2710/18; B60W 2710/20; B60W 2720/106; B60W 2720/125; B60W 50/0098; B60W 60/0027; G01C 21/32
See application file for complete search history.

(56) References Cited

U.S. PATENT DOCUMENTS

| | | | |
|---|---|---|---|
| 6,587,785 | B2 | 7/2003 | Jijina et al. |
| 6,697,730 | B2 | 2/2004 | Dickerson |
| 7,444,241 | B2 | 10/2008 | Grimm |
| 7,840,427 | B2 | 11/2010 | O'Sullivan |
| 8,170,739 | B2 | 5/2012 | Lee |
| 8,364,334 | B2 | 1/2013 | Au et al. |
| 8,428,843 | B2 | 4/2013 | Lee et al. |
| 8,612,139 | B2 | 12/2013 | Wang et al. |
| 8,849,515 | B2 | 9/2014 | Moshchuk et al. |
| 9,014,915 | B2 | 4/2015 | Chatterjee et al. |
| 9,079,587 | B1 | 7/2015 | Rupp et al. |
| 9,099,006 | B2 | 8/2015 | Mudalige et al. |
| 9,139,204 | B1 | 9/2015 | Zhao et al. |
| 9,229,453 | B1 | 1/2016 | Lee |
| 9,283,967 | B2 | 3/2016 | Lee |
| 9,487,212 | B1 | 11/2016 | Adam et al. |
| 9,517,771 | B2 | 12/2016 | Attard et al. |
| 9,587,952 | B1 | 3/2017 | Slusar |
| 9,771,070 | B2 | 9/2017 | Zagorski et al. |
| 9,815,481 | B2 | 11/2017 | Goldman-Shenhar et al. |
| 9,868,443 | B2 | 1/2018 | Zeng et al. |
| 9,971,945 | B2 | 5/2018 | Zhao et al. |
| 9,972,206 | B2 | 5/2018 | Zhao et al. |
| 10,384,717 | B2 * | 8/2019 | Choi .................. B60W 30/09 |
| 10,814,876 | B2 * | 10/2020 | Liu .................. B60W 60/0027 |
| 2008/0046174 | A1 | 2/2008 | Johnson |
| 2009/0030885 | A1 | 1/2009 | DePasquale et al. |
| 2010/0228415 | A1 | 9/2010 | Paul |
| 2011/0059693 | A1 | 3/2011 | O'Sullivan |
| 2011/0313880 | A1 | 12/2011 | Paul et al. |
| 2012/0101713 | A1 | 4/2012 | Moshchuk et al. |
| 2012/0239452 | A1 | 9/2012 | Trivedi et al. |
| 2012/0314070 | A1 | 12/2012 | Zhang et al. |
| 2013/0032421 | A1 | 2/2013 | Bonne et al. |
| 2013/0035821 | A1 | 2/2013 | Bonne et al. |
| 2013/0054128 | A1 | 2/2013 | Moshchuk et al. |
| 2013/0204676 | A1 | 8/2013 | Hindi et al. |
| 2013/0219294 | A1 | 8/2013 | Goldman-Shenhar et al. |
| 2014/0011522 | A1 | 1/2014 | Lin et al. |
| 2015/0353082 | A1 | 12/2015 | Lee et al. |
| 2015/0353085 | A1 | 12/2015 | Lee |
| 2016/0003938 | A1 | 1/2016 | Gazit et al. |
| 2016/0084944 | A1 | 3/2016 | Bialer et al. |
| 2016/0084953 | A1 | 3/2016 | Stainvas Olshansky et al. |
| 2016/0084954 | A1 | 3/2016 | Bilik et al. |
| 2016/0231124 | A1 | 8/2016 | Nickolaou et al. |
| 2016/0313133 | A1 * | 10/2016 | Zeng .................. B60W 60/0011 |
| 2016/0320194 | A1 | 11/2016 | Liu et al. |
| 2016/0320195 | A1 | 11/2016 | Liu et al. |
| 2016/0320198 | A1 | 11/2016 | Liu et al. |
| 2016/0321566 | A1 | 11/2016 | Liu et al. |
| 2016/0321771 | A1 | 11/2016 | Liu et al. |
| 2017/0021830 | A1 | 1/2017 | Feldman et al. |
| 2017/0293024 | A1 | 10/2017 | Villeval et al. |
| 2017/0371030 | A1 | 12/2017 | Pokrass et al. |
| 2018/0074191 | A1 | 3/2018 | Bilik et al. |
| 2018/0120429 | A1 | 5/2018 | Bialer |
| 2018/0128912 | A1 | 5/2018 | Bialer |
| 2018/0128913 | A1 | 5/2018 | Bialer |
| 2018/0128916 | A1 | 5/2018 | Bialer |
| 2018/0128917 | A1 | 5/2018 | Bialer |
| 2018/0166794 | A1 | 6/2018 | Raphaeli et al. |
| 2018/0210067 | A1 | 7/2018 | Bilik et al. |
| 2018/0275264 | A1 | 9/2018 | Bilik et al. |
| 2018/0281793 | A1 * | 10/2018 | Terayama ......... B60W 30/0956 |
| 2018/0284220 | A1 | 10/2018 | Bilik et al. |
| 2019/0197902 | A1 * | 6/2019 | Shin .................. B60W 30/0956 |
| 2019/0369616 | A1 * | 12/2019 | Ostafew ............... G08G 1/0112 |
| 2020/0318976 | A1 * | 10/2020 | Bush .................... G05D 1/0274 |
| 2021/0046927 | A1 * | 2/2021 | Miller ............... B60W 30/0953 |
| 2021/0061266 | A1 * | 3/2021 | Pontisakos ........ B60W 30/0956 |
| 2021/0104060 | A1 * | 4/2021 | Stein ..................... G08G 1/0141 |
| 2021/0253136 | A1 * | 8/2021 | Yoshihara ......... B60W 60/00274 |
| 2022/0126882 | A1 * | 4/2022 | Oh .................. B60W 30/18163 |
| 2022/0379922 | A1 * | 12/2022 | Takama .......... B60W 30/18145 |

FOREIGN PATENT DOCUMENTS

| | | | | |
|---|---|---|---|---|
| DE | 102018121588 | A1 * | 3/2019 | ............. B60Q 9/008 |
| WO | WO-2019195415 | A1 * | 10/2019 | ............ B60W 30/08 |

\* cited by examiner

AUTOMATED DRIVING SYSTEMS AND CONTROL LOGIC FOR LANE LOCALIZATION OF TARGET OBJECTS IN MAPPED ENVIRONMENTS

INTRODUCTION

The present disclosure relates generally to motor vehicles with automated driving capabilities. More specifically, aspects of this disclosure relate to automated vehicle driving systems with vehicle path planning and target tracking features.

Current production motor vehicles, such as the modern-day automobile, may be equipped with a network of onboard electronic devices that provide automated driving capabilities that help to minimize driver effort. In automotive applications, for example, the most recognizable type of automated driving feature is the cruise control system. Cruise control allows a vehicle operator to set a particular vehicle speed and have the onboard vehicle computer system maintain that speed without the driver operating the accelerator or brake pedals. Next-generation Adaptive Cruise Control (ACC) is an automated driving feature that regulates vehicle speed while concomitantly managing headway spacing between the host vehicle and a leading "target" vehicle. Another type of automated driving feature is the Collision Avoidance System (CAS), which detects imminent collision conditions and provides a warning to the driver while also taking preventative action autonomously, e.g., by steering or braking without driver input. Intelligent Parking Assist Systems (IPAS), Lane Monitoring and Automated Steering ("Auto Steer") Systems, Electronic Stability Control (ESC), and other Advanced Driver Assistance Systems (ADAS) are also available on many modern-day automobiles.

As vehicle processing, communication, and sensing capabilities continue to improve, manufacturers will persist in offering more automated driving capabilities with the aspiration of producing fully autonomous "self-driving" vehicles competent to operate among heterogeneous vehicle types in both urban and rural scenarios. Original equipment manufacturers (OEM) are moving towards vehicle-to-vehicle (V2V) and vehicle-to-infrastructure (V2I) "talking" cars with higher-level driving automation that employ autonomous control systems to enable vehicle routing with steering, lane changing, scenario planning, etc. Automated path planning systems utilize vehicle state and dynamics sensors, geolocation information, map and road condition data, and path prediction algorithms to provide route derivation with automated lane center and lane change forecasting. Computer-assisted rerouting techniques offer alternative travel route prediction that may be updated, for example, based on real-time and virtual vehicle data.

Many automobiles are now equipped with onboard vehicle navigation systems that utilize a global positioning system (GPS) transceiver in cooperation with navigation software and geolocation mapping services to obtain roadway topography, traffic, and speed limit data associated with the vehicle's current location. Autonomous driving and advanced driver assistance systems are often able to adapt certain automated driving maneuvers based on roadway information obtained by the in-vehicle navigation system. Ad-hoc-network-based ADAS, for example, may employ GPS and mapping data in conjunction with multi-hop geo-cast V2V and V2I data exchanges to facilitate automated vehicle maneuvering and powertrain control. During assisted and unassisted vehicle operation, the resident navigation system may identify a recommended travel route based on an estimated shortest travel time or estimated shortest travel distance between route origin and route destination for a given trip. This recommended travel route may then be displayed as a map trace or as turn-by-turn driving directions on a geocoded and annotated map with optional voice commands output by the in-vehicle audio system.

Automated and autonomous vehicle systems may employ an assortment of commercially available components to provide target object detection and ranging. For instance, radio detection and ranging (RADAR) systems detect the presence, distance, and/or speed of a target object by discharging pulses of high-frequency electromagnetic waves that are reflected off the object back to a suitable radio receiver. As another option, a vehicle may employ a laser detection and ranging (LADAR) backscatter system that emits and detects pulsed laser beams to make precise distance measurements. Synonymous to—and often used as the umbrella term for—LADAR-based detection is light detection and ranging (LIDAR) technology that determines distances to stationary or moving targets using assorted forms of light energy, including invisible, infrared light spectrums and near-infrared laser light spectrums. A vehicle-mounted sensor farm with assorted digital cameras, ultrasonic sensors, etc., also provides real-time target data. Historically, these ranging systems may be limited in accuracy and application due to a narrow field-of-view in the near-field of the vehicle and, thus, may be unable to quickly and accurately detect a target vehicle that unexpectedly cuts in front of the host vehicle.

SUMMARY

Presented herein are target acquisition systems with attendant control logic for target object detection and tracking, methods for making and methods for operating such systems, and intelligent motor vehicles with real-time lane localization for target objects in mapped environments. By way of example, a controller-executable algorithm localizes target vehicles within complex mapped environments proximate a host vehicle. Lane polynomials are linearized locally around the target vehicles by employing an analytical solution in real time that is deployable via a low-throughput controller. For instance, a map-based absolute lane assignment approach computes a piecewise linearized road map for an upcoming road segment and concomitantly calculates lateral distances between each target vehicle and the linearized road map. Disclosed techniques may also ascertain if a target vehicle is encroaching on the host vehicle's lane and, if so, identifies a percentage of the target vehicle that is within the host lane and dynamically reclassifies the target to the host lane as a function of longitudinal offset for the encroaching target. The foregoing techniques may yield a determin istic representation of target lane assignment to enable more accurate mission planning (e.g., deriving a commanded navigation map for predicting host vehicle speed and trajectory commands). The foregoing techniques may be applied to standard highway and roadway lanes, exit/on ramps, lane splits, lane merges, intersections, mapped off highway environments, etc.

Attendant benefits for at least some of the disclosed concepts include target acquisition systems that more accurately assign each target vehicle to a lane (e.g., 200 m+ ahead of the host vehicle in favorable and adverse conditions), which enables accurate lane cut-in forecasting that yields more intuitive host response to targets. Disclosed techniques also help to improve the accuracy and responsiveness of vehicle-implemented ADAS features, including Automated Lane Change (ALC) in complex highway scenarios. In addition, herein-described map-based lane assignment methods may help to eliminate the need for synchronization between lane change completion and performing lane assignment, and may remove ambiguities during both host and target vehicle lane transition maneuvers. Enhanced target acquisition and analysis may also help to ensure top-level automated driving performance, yielding more consistent and reliable system operation, without redundancy in dedicated sensors and hardware.

Aspects of this disclosure are directed to system control logic, closed-loop feedback control techniques, and computer-readable media (CRM) for manufacturing or operating a target acquisition system of a host vehicle. In an example, a method is presented for controlling operation of a motor vehicle. This representative method includes, in any order and in any combination with any of the above and below disclosed options and features: receiving, e.g., via a resident or remote electronic controller from one or more sensors in a sensor array mounted to the host vehicle, sensor data indicative of target dynamics information for one or more target vehicles; estimating, e.g., via the electronic controller using the received sensor data, a predicted lane assignment for each target vehicle on a road segment fore and/or aft of the host vehicle; receiving, e.g., via the electronic controller from a resident or remote memory-stored map database, map data indicative of roadway information of the road segment; fusing the sensor data with the map data to construct a polynomial overlay for a host lane of the road segment the host vehicle is traveling in; constructing a piecewise linearized road map of the host lane; combining the piecewise linearized road map with the predicted lane assignment(s) and the polynomial overlay to calculate a lane assignment for each target vehicle; and transmitting, e.g., via the electronic controller to one or more resident vehicle systems, one or more command signals to execute one or more control operations based, at least in part, on the calculated lane assignment for each target vehicle.

Additional aspects of this disclosure are directed to vehicles with real-time lane localization capabilities for target objects in mapped environments. As used herein, the terms "vehicle" and "motor vehicle" may be used interchangeably and synonymously to include any relevant vehicle platform, such as passenger vehicles (e.g., combustion engine, hybrid, full electric, fully and partially autonomous, etc.), commercial vehicles, industrial vehicles, tracked vehicles, motorcycles, off-road and all-terrain vehicles (ATV), etc. For purposes of this disclosure, the terms "automated" and "autonomous" may be used synonymously and interchangeably to include vehicles or vehicle systems provisioning assisted and/or fully autonomous driving capabilities, including vehicle platforms classified as Society of Automotive Engineers (SAE) Levels 2, 3, 4 or 5 vehicles. SAE Level 2, for example, allows for unassisted and partially assisted driving with sufficient automation for limited vehicle control, such as auto steer and full-speed range active cruise control (FSRACC), while obliging immediate driver intervention. At the upper end of the spectrum is Level 5 automation that altogether removes human intervention from vehicle driving operation, e.g., eliminating the steering wheel, throttle and brake pedals, shift knob, etc.

In an example, a motor vehicle includes a vehicle body with a passenger compartment, multiple road wheels rotatably mounted to the vehicle body (e.g., via corner modules coupled to a unibody or body-on-frame chassis), and other standard original equipment. A prime mover, which may be embodied as an internal combustion engine (ICE) assembly and/or an electric traction motor, is mounted to the vehicle body and operates to drive one or more of the road wheels to thereby propel the vehicle. Also mounted to the vehicle body is a sensor array, which may be embodied as a sensor farm outfit with short-range and long-range RADAR, digital cameras, LiDAR, etc., that communicates with one or more resident or remote electronic vehicle controllers.

Continuing with the discussion of the preceding example, the vehicle controller(s) is/are programmed to: receive, from the sensor array, sensor data indicative of target dynamics information for a target vehicle; estimate, using the received sensor data, a predicted lane assignment for the target vehicle on a road segment fore or aft of the motor vehicle; receive, from a memory-stored map database, map data indicative of roadway information of the road segment; fuse the sensor data with the map data to construct a polynomial overlay for a host lane of the road segment across which travels the motor vehicle; construct a piecewise linearized road map of the host lane of the road segment; combine the piecewise linearized road map with the predicted lane assignment and the polynomial overlay to determine a calculated lane assignment for the target vehicle; and transmit a command signal to a resident vehicle system to execute a control operation using the calculated lane assignment for the target vehicle.

For any of the disclosed systems, vehicles, and methods, constructing a piecewise linearized road map may include calculating a piecewise linear road map as a function of a y-intercept of a piecewise linear representation of the polynomial overlay, lateral and longitudinal positions of upper and lower boundaries of the piecewise linearized road map segment, and a slope of the piecewise linear representation. Constructing a piecewise linearized road map may also include calculating a lateral distance between the target vehicle and the piecewise linearized road map as a function of lateral and longitudinal positions of the target vehicle, and a parametric distance between the target vehicle and a designated point on the piecewise linearized road map segment.

For any of the disclosed systems, vehicles, and methods, the electronic vehicle controller(s) may also be programmed to: designate the target vehicle as an existing fused track responsive to the sensor array detecting the target vehicle for at least a predefined minimum number of tracking cycles (e.g., 10+ cycles); receive, from the sensor array, real-time measurements of target vehicle movement; and associate at least a subset of the received real-time measurements with the existing fused track based on a comparison of target vehicle position and/or velocity data of the target vehicle with target position and/or velocity data contained in the real-time measurements. In this instance, the electronic vehicle controller(s) may also be programmed to: estimate a set of state variables for the existing fused track based on statistical noise within a set of current track variables and statistical noise within a set of incoming measurement variables; and determine a corrected set of state variables by filtering the set of state variables with a Kalman Filter. As yet another option, a future set of state variables may be estimated for the existing fused track at a next time step using the corrected set of state variables.

For any of the disclosed systems, vehicles, and methods, the electronic vehicle controller(s) may also be programmed to: determine if the target vehicle has breached a lane line of the host lane; if so, determine a percentage of the target vehicle within the host lane; and dynamically reclassify the calculated lane assignment of the lane-breaching target vehicle to the host lane as a function of the breach percentage. As yet another option, the target dynamics information may include location data, distance data, speed data, trajectory data, etc. of the target vehicle. In this instance, the electronic controller may communicate with the sensor array to receive lane line data for the lane of the road segment. In this instance, estimating the predicted lane assignment for the target vehicle may include comparing the target dynamics information and the lane line data.

For any of the disclosed systems, vehicles, and methods, the resident vehicle system may include an autonomous driving control module that automates driving of the motor vehicle; the control operation may include automating driving of the motor vehicle to complete a driving maneuver based on the calculated lane assignment for the target vehicle. Optionally, the resident vehicle system includes an ADAS control module that automates control of the motor vehicle; the control operation may include executing a braking, steering, and/or acceleration maneuver based on the target vehicle's calculated lane assignment. The resident vehicle system may include a vehicle navigation system with an electronic display device; the control operation may include the display device displaying an indication of the target vehicle within proximity of the motor vehicle and an indication of the calculated lane assignment for the target vehicle.

The above summary does not represent every embodiment or every aspect of this disclosure. Rather, the above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes any and all combinations and subcombinations of the elements and features described above and below.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for instance, by the appended claims.

DETAILED DESCRIPTION

This disclosure is susceptible of embodiment in many forms. Representative examples of the disclosure are shown in the drawings and herein described in detail with the understanding that these embodiments are provided as an exemplification of the disclosed principles, not limitations of the broad aspects of the disclosure. To that end, elements and limitations that are described, for example, in the Abstract, Introduction, Summary, Description of the Drawings, and Detailed Description sections, but not explicitly set forth in the claims, should not be incorporated into the claims, singly or collectively, by implication, inference, or otherwise. Moreover, the drawings discussed herein may not be to scale and are provided purely for instructional purposes. Thus, the specific and relative dimensions shown in the Figures are not to be construed as limiting.

For purposes of the Detailed Description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and permutations thereof, shall each mean "including without limitation." Moreover, words of approximation, such as "about," "almost," "substantially," "generally," "approximately," and the like, may each be used herein in the sense of "at, near, or nearly at," or "within 0-5% of" or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle, when the vehicle is operatively oriented on a horizontal driving surface.

Figure 1:
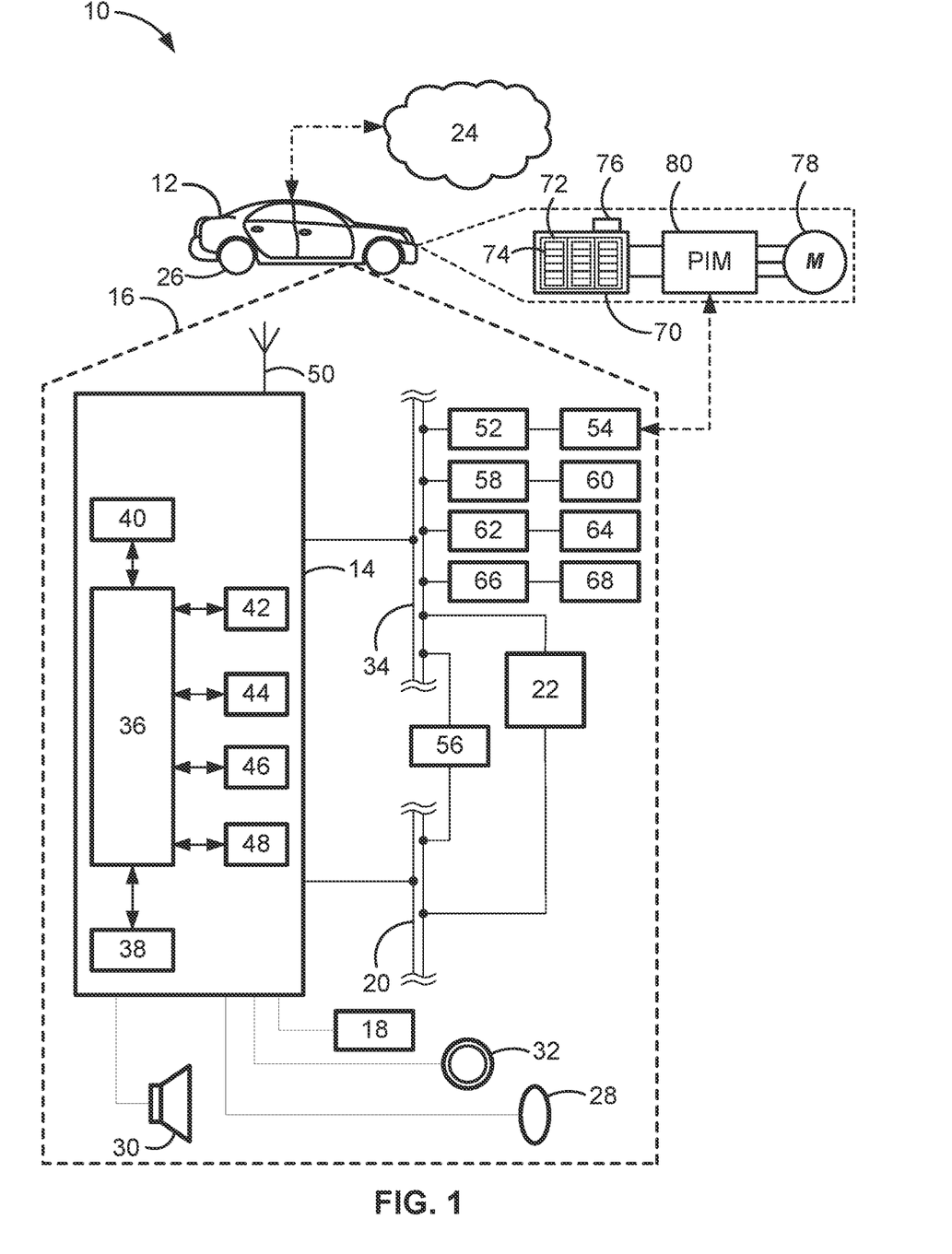
FIG. 1 is a partially schematic, side-view illustration of a representative motor vehicle with a network of in-vehicle controllers, sensing devices, and communication devices for performing lane localization of target objects in mapped environments according to aspects of the disclosed concepts.

Referring now to the drawings, wherein like reference numbers refer to like features throughout the several views, there is shown in FIG. 1 a representative automobile, which is designated generally at 10 and portrayed herein for purposes of discussion as a sedan-style, electric-drive passenger vehicle. The illustrated automobile 10—also referred to herein as "motor vehicle" or "vehicle" for short—is merely an exemplary application with which novel aspects of this disclosure may be practiced. In the same vein, incorporation of the present concepts into an all-electric vehicle powertrain should also be appreciated as a non-limiting implementation of disclosed features. As such, it will be understood that aspects and features of this disclosure may be applied to other powertrain architectures, may be implemented for any logically relevant type of vehicle, and may be utilized for assorted ADAS and autonomous vehicle operations. Moreover, only select components of the motor vehicles and vehicle control systems are shown and described in additional detail herein. Nevertheless, the vehicles and vehicle systems discussed below may include numerous additional and alternative features, and other available peripheral components, for carrying out the various methods and functions of this disclosure.

The representative vehicle 10 of FIG. 1 is originally equipped with a vehicle telecommunication and information ("telematics") unit 14 that wirelessly communicates, e.g., via cell towers, base stations, mobile switching centers, satellite service, etc., with a remotely located or "off-board" cloud computing host service 24 (e.g., ONSTAR®). Some of the other vehicle hardware components 16 shown generally in FIG. 1 include, as non-limiting examples, an electronic video display device 18, a microphone 28, audio speakers 30, and assorted input controls 32 (e.g., buttons, knobs, pedals, switches, touchpads, joysticks, touchscreens, etc.). These hardware components 16 function, in part, as a human/machine interface (HMI) to enable a user to communicate with the telematics unit 14 and other system components within the vehicle 10. Microphone 28 provides a vehicle occupant with means to input verbal or other auditory commands; the vehicle 10 may be equipped with an embedded voice-processing unit utilizing audio filtering, editing, and analysis modules. Conversely, the speakers 30 provide audible output to a vehicle occupant and may be either a stand-alone speaker dedicated for use with the telematics unit 14 or may be part of an audio system 22. The audio system 22 is operatively connected to a network connection interface 34 and an audio bus 20 to receive analog information, rendering it as sound, via one or more speaker components.

Communicatively coupled to the telematics unit 14 is a network connection interface 34, suitable examples of which include twisted pair/fiber optic Ethernet switch, parallel/serial communications bus, local area network (LAN) interface, controller area network (CAN) interface, media-oriented system transfer (MOST) interface, local interconnection network (LIN) interface, and the like. Other appropriate communication interfaces may include those that conform with ISO, SAE, and/or IEEE standards and specifications. The network connection interface 34 enables the vehicle hardware 16 to send and receive signals with one another and with various systems and subsystems both within or "resident" to the vehicle body 12 and outside or "remote" from the vehicle body 12. This allows the vehicle 10 to perform various vehicle functions, such as modulating powertrain output, governing operation of the vehicle's transmission, selectively engaging the friction and regenerative brake systems, controlling vehicle steering, regulating charge and discharge of the vehicle's battery modules, and other automated driving functions. For instance, telematics unit 14 receives and transmits signals and data to/from a Powertrain Control Module (PCM) 52, an Advanced Driver Assistance System (ADAS) module 54, an Electronic Battery Control Module (EBCM) 56, a Steering Control Module (SCM) 58, a Brake System Control Module (BSCM) 60, and assorted other vehicle ECUs, such as a transmission control module (TCM), engine control module (ECM), Sensor System Interface Module (SSIM), etc.

With continuing reference to FIG. 1, telematics unit 14 is an onboard computing device that provides a mixture of services, both individually and through its communication with other networked devices. This telematics unit 14 is generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to a real-time clock (RTC) 42 and one or more electronic memory devices 38, each of which may take on the form of a CD-ROM, magnetic disk, IC device, flash memory, semiconductor memory (e.g., various types of RAM or ROM), etc.

Long-range vehicle communication capabilities with remote, off-board networked devices may be provided via one or more or all of a cellular chipset/component, a navigation and location chipset/component (e.g., global positioning system (GPS) transceiver), or a wireless modem, all of which are collectively represented at 44. Close-range wireless connectivity may be provided via a short-range wireless communication device 46 (e.g., a BLUETOOTH® unit or near field communications (NFC) transceiver), a dedicated short-range communications (DSRC) component 48, and/or a dual antenna 50. It should be understood that the vehicle 10 may be implemented without one or more of the above listed components or, optionally, may include additional components and functionality as desired for a particular end use. The various communication devices described above may be configured to exchange data as part of a periodic broadcast in a vehicle-to-vehicle (V2V) communication system or a vehicle-to-everything (V2X) communication system, e.g., Vehicle-to-Infrastructure (V2I), Vehicle-to-Pedestrian (V2P), Vehicle-to-Device (V2D), etc.

CPU 36 receives sensor data from one or more sensing devices that use, for example, photo detection, radar, laser, ultrasonic, optical, infrared, or other suitable technology for executing an automated driving operation, including short range communications technologies such as DSRC or Ultra-Wide Band (UWB). In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion and analysis hardware and software for processing raw sensor data. The type, placement, number, and interoperability of the distributed array of in-vehicle sensors may be adapted, singly or collectively, to a given vehicle platform for achieving a desired level of autonomous vehicle operation.

Digital camera 62 may use a charge coupled device (CCD) sensor or other suitable optical sensor to generate images indicating a field-of-view of the vehicle 10, and may be configured for continuous image generation, e.g., at least about 35+ images per second. By way of comparison, range sensor 64 may emit and detect reflected radio, infrared, light-based or other electromagnetic signals (e.g., short-range radar, long-range radar, EM inductive sensing, Light Detection and Ranging (LIDAR), etc.) to detect, for example, presence, geometric dimensions, and/or proximity of a target object. Vehicle speed sensor 66 may take on various forms, including wheel speed sensors that measure wheel speeds, which are then used to determine real-time vehicle speed. In addition, the vehicle dynamics sensor 68 may be in the nature of a single-axis or a triple-axis accelerometer, an angular rate sensor, an inclinometer, etc., for detecting longitudinal and lateral acceleration, yaw, roll, and/or pitch rates, or other dynamics related parameters. Using data from the sensing devices 62, 64, 66, 68, the CPU 36 identifies surrounding driving conditions, determines roadway characteristics and surface conditions, identifies target objects within a detectable range of the vehicle, determines attributes of the target object, such as size, relative position, distance, angle of approach, relative speed, etc., and executes automated control maneuvers based on these executed operations.

These sensors may be distributed throughout the motor vehicle 10 in operatively unobstructed positions relative to views fore or aft or on port or starboard sides of the vehicle. Each sensor generates electrical signals indicative of a characteristic or condition of the host vehicle or one or more targeted objects, generally as an estimate with a corresponding standard deviation. While the operating characteristics of these sensors are generally complementary, some are more reliable in estimating certain parameters than others. Most sensors have different operating ranges and areas of coverage and are capable of detecting different parameters within their operating range. For instance, a radar-based sensor may estimate range, range rate, and azimuth location of an object, but may not be robust in estimating the extent of a detected object. Cameras with optics processing, on the other hand, may be more robust in estimating a shape and azimuth position of an object, but may be less efficient at estimating a range and range rate of a target object. A scanning-type LIDAR-based sensor may perform efficiently and accurately with respect to estimating range and azimuth position, but may be unable to accurately estimate range rate and, thus, may not be accurate with respect to new object acquisition/recognition. Ultrasonic sensors, by comparison, are capable of estimating range but are generally unable to accurately estimate range rate and azimuth position. Further, the performance of many sensor technologies may be affected by differing environmental conditions. Consequently, sensors generally present parametric variances whose operative overlap offer opportunities for sensory fusion.

A sensor fusion control module may execute a fusion algorithm in conjunction with associated memory-stored calibration information to receive sensor data from available sensors, cluster the data into usable estimations and measurements, and fuse the clustered observations to determine, for example, lane geometry and relative target position estimates. The fusion algorithm may utilize any suitable sensor fusion method, such as Kalman filtering (KF) fusion applications. A KF application may be used to explore correlative characteristics of each target along a temporal axis (e.g., assuming that a tracked target moves smoothly over a predefined period of time). Likewise, a KF application may capture spatial correlations, namely the relative position of each target object to the host vehicle as observed by multiple sensors. Additional information regarding sensor data fusion may be found in U.S. Pat. No. 7,460,951 B2, to Osman D. Altan et al., which is incorporated herein by reference in its entirety and for all purposes.

To propel the electric-drive vehicle 10, an electrified powertrain is operable to generate and deliver tractive torque to one or more of the vehicle's road wheels 26. The powertrain is generally represented in FIG. 1 by a rechargeable energy storage system (RESS), which may be in the nature of a chassis-mounted traction battery pack 70, that is operatively connected to an electric traction motor 78. The traction battery pack 70 is generally composed of one or more battery modules 72 each having a stack of battery cells 74, such as lithium ion, lithium polymer, or nickel metal hydride battery cells of the pouch, can, or prismatic type. One or more electric machines, such as traction motor/generator (M) units 78, draw electrical power from and, optionally, deliver electrical power to the RESS's battery pack 70. A dedicated power inverter module (PIM) 80 electrically connects the battery pack 70 to the motor/generator (M) unit(s) 78 and modulates that transmission of electrical current therebetween.

The battery pack 70 may be configured such that module management, cell sensing, and module-to-module or module-to-host communication functionality is integrated directly into each battery module 72 and performed wirelessly via a wireless-enabled cell monitoring unit (CMU) 76. The CMU 76 may be a microcontroller-based, printed circuit board (PCB)-mounted sensor array. Each CMU 76 may have a GPS transceiver and RF capabilities and may be packaged on or in a battery module housing. The battery module cells 74, CMU 76, housing, coolant lines, busbars, etc., collectively define the cell module assembly.

Figure 2:
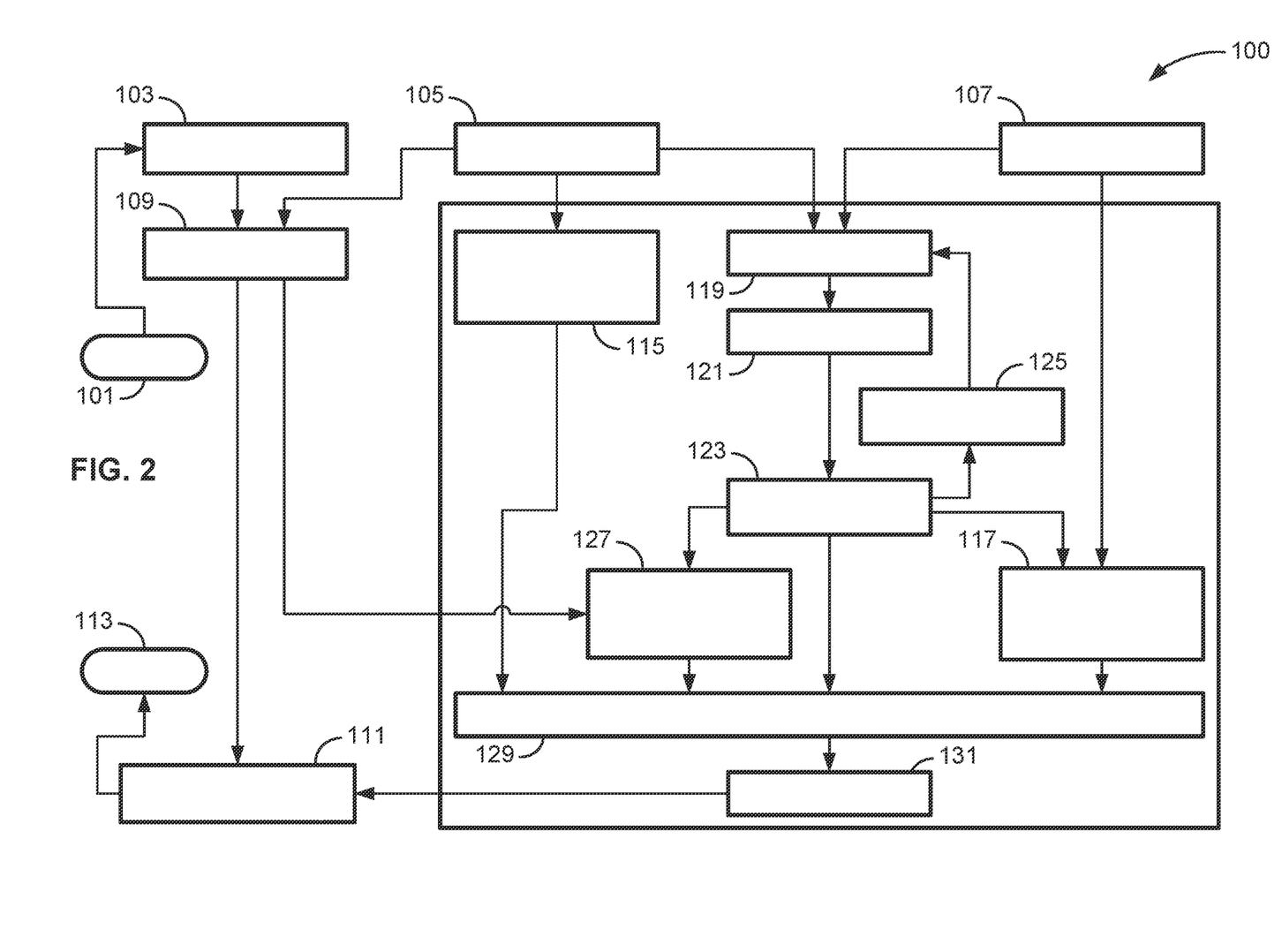
FIG. 2 is a flowchart illustrating a representative object lane localization protocol for operating a motor vehicle, which may correspond to memory-stored instructions that are executable by a resident or remote controller, control-logic circuit, programmable control unit, or other integrated circuit (IC) device or network of devices in accord with aspects of the disclosed concepts.

With reference next to the flow chart of FIG. 2, an improved method or control strategy for target acquisition and object lane localization for a host vehicle, such as vehicle 10 of FIG. 1, is generally described at 100 in accordance with aspects of the present disclosure. Some or all of the operations illustrated in FIG. 2, and described in further detail below, may be representative of an algorithm that corresponds to processor-executable instructions that are stored, for example, in main or auxiliary or remote memory (e.g., memory device 38 of FIG. 1), and executed, for example, by an electronic controller, processing unit, logic circuit, or other module or device or network of modules/devices (e.g., CPU 36 and/or cloud computing service 24 of FIG. 1), to perform any or all of the above and below described functions associated with the disclosed concepts. It should be recognized that the order of execution of the illustrated operation blocks may be changed, additional operation blocks may be added, and some of the described operations may be modified, combined, or eliminated.

Method 100 of FIG. 2 begins at START terminal block 101 with memory-stored, processor-executable instructions for a programmable controller or control module or similarly suitable processor to call up an initialization procedure for a target acquisition and tracking protocol. This routine may be executed in real-time, near real-time, continuously, systematically, sporadically, and/or at regular intervals, for example, each 10 or 100 milliseconds during normal and ongoing operation of the motor vehicle 10. As yet another option, terminal block 101 may initialize responsive to a user command prompt, a resident vehicle controller prompt, or a broadcast prompt signal received from an "off-board" centralized vehicle services system (e.g., host cloud computing service 24). Upon completion of the control operations presented in FIG. 2, the method 100 may advance to END terminal block 113 and temporarily terminate or, optionally, may loop back to terminal block 101 and run in a continuous loop.

Advancing from terminal block 101, the method 100 executes MAP DATA database block 103 to retrieve, prompt, and/or access (collectively "receiving") map data indicative of roadway information for one or more road segments fore/aft of the host vehicle. By way of non-limiting example, a High-Definition Localization Module (HDLM) uses real-time GPS coordinate data of the host vehicle to pull road-level and lane-level data from a memory-stored map database. Road-level data may include plan-view topology, lane center and alignment information, road segment intersection information (e.g., 3-way intersection, 4-way intersection, stop sign, stop light, etc.), a name for each road segment, a speed limit for each road segment, traffic, construction, etc. Lane-level data, by comparison, may include: a total number of lanes (single lane, double lanes, $N_\#$ lanes, one-way road, two-way road, center turn lane, flanking turn lanes, etc.); number of left-hand turn lanes (if any), number of right-hand turn lanes (if any), and number of straightaway lanes (if any); turning rules for each lane (e.g., dedicated right-turn only, dedicated left-turn only, straight and left-turn lane, etc.), etc.

Upon receipt of the map data, resident navigation software translates the road and lane-level data to a host reference frame based on the host vehicle's GPS-based geolocation information. The host reference frame may be a vehicle-calibrated spatial frame of reference with a coordinate system that serves to describe the position of objects relative to the host and whose origin, orientation, and scale may be specified by a set of reference points. The received map data is aligned with respect to the host reference frame, e.g., locating the host vehicle between lane boundary lines and, if appropriate, placing a host reference frame origin on or adjacent a lane centerline. Once in the host vehicle reference frame, lane polynomial information such as width, host vehicle offset, heading, curvature, etc., may be derived for each of the available lanes on a road segment across which the host vehicle travels. For visual display, the system may overlay real-time host vehicle and target vehicle(s) locations on top of the roadway information in order to identify, track, and estimate lane orientation for nearby targets.

Prior to, contemporaneous with, or subsequent to receiving map data at database block 103, method 100 executes SENSOR DATA input block 105 to receive sensor data from a distributed senor array, such as a vehicle-mounted sensor farm with assorted forward and rearward digital cameras, radar transmitters/receivers, LiDAR phased array and laser emitters, rearview mirror-mounted port and starboard cameras, etc. For instance, the ADAS module 54 of FIG. 1 polls the in-vehicle cameras 62, range sensors 64, etc., to identify target vehicles, if any, within a predetermined proximity of the motor vehicle 10 (e.g., ~200 m fore and ~100 m aft of a host). In-vehicle sensors may also be used to determine lane-specific information, such as identifying lane markers, lane center, lane merging, lane parallelism, lane shifting, surface conditions, etc. It may be desirable, for at least some implementations, that the host vehicle does not use V2V, V2I, nor DSRC for target acquisition during lane localization; rather, the system may save computing and processing resources by utilizing resident cameras and short/long range radar for target vehicle detection and localization.

At VEHICLE DYNAMICS DATA input block 107, method 100 receives vehicle dynamics sensor data from one or more corresponding in-vehicle sensor devices. As a non-limiting example, the ADAS module 54 of FIG. 1 prompts the vehicle speed sensors 66 and vehicle dynamics sensors 68 for real-time or near real-time longitudinal and lateral dynamics data, which may be indicative of host vehicle speed, acceleration (positive/negative), heading, pitch, roll, yaw, inclination, etc. Tracking host vehicle and target vehicle dynamics at one time step helps the system to predict that target vehicle's location and heading at the next time step. This also allows the system to align the current time step's measurements with the next time step's incoming measurements. The vehicle's ADAS/autonomous driving system may track and learn driving patterns for the host vehicle, including historical steering angle data, steering speed, vehicle speed, yaw rate, lateral acceleration, longitudinal acceleration, etc., to predict driver intent.

Upon receipt of the map data and sensor data at blocks 103 and 105, method 100 advances to LANE MAP FUSION subroutine block 109 to estimate a predicted lane assignment for a target vehicle on a road segment that is either fore, aft, or adjacent the host vehicle. For example, map data and sensor data are fused—pre-processed to eliminate noise, correlated to eliminate timing disparities, clustered into predefined groups, and analyzed—to identify targets within proximity to the host and derive lane data for each of the one or more lanes of the subject road segment. Lane map fusion may also use a host vehicle's current and historical movement data to construct map data forward and/or behind the host vehicle. This map data may be constructed from the fused map and sensor data by combining the lane map data provided by the HDLM with sensor data received from the resident vehicle cameras that is indicative of the observable lanes around the host. This combined data is then fused to provide a better estimate of the lane information (e.g., as an add-on to or a supplement for map data based lane information). At this juncture, polynomial information for individual lanes and x-y coordinate information for host and target vehicles may be overlaid onto map. Upon completion of the lane map fusion subroutine 109, method 100 may proceed to THREAT SELECTION/MISSION PLANNING subroutine 111, which will be explained in further detail below.

In addition to employing data fusion techniques to estimate a combination sensor and map-based predicted lane assignment for each target vehicle at subroutine block 109, method 100 executes SENSOR PROVIDED RELATIVE LANE ASSIGNMENT subroutine 115 to estimate a sensor-based predicted lane assignment for a target vehicle based on the data received from the in-vehicle sensors at input block 105. For instance, CPU 36 of FIG. 1 draws camera sensor signals from a camera 62 to a detect and locate a target object, and range sensor signals from a RADAR or LiDAR-based range sensor 64 to track range and range rate of the detected target. Resident camera(s) may be employed to contemporaneously observe lane-specific information for the host vehicle's (host) lane and the target vehicle's (target) lane, which may be distinct or one and the same. Target data and lane data are evaluated in tandem to estimate a lane for each target. For instance, RADAR sensor signals for the target may be processed and compared to camera sensor signals for the lane and evaluated with reference to the host vehicle path in order to determine which relative lane a target is in based on a corresponding, internally measured target position.

Method 100 also estimates a dynamics-based predicted lane assignment for a target vehicle based on the dynamics data received at block 107, as indicated at VEHICLE PATH BASED RELATIVE LANE ASSIGNMENT subroutine block 117. By way of example, and not limitation, when a host vehicle traverses a road segment that lacks existing map information, the HDLM evaluates the host vehicle's dynamics data to derive lane info by reconstructing a prior-travelled path for the host to build a forward map ahead of the host. The EOCM may collect data from one or more in-vehicle dynamics sensors and records data relating to vehicle driving path from a start position to a destination position. An external object calculation module (EOCM) then analyzes host and target dynamics data to derive a relative lane offset of the target vehicle compared to the host vehicle's current path forward. In a more specific example, the EOCM uses prior-traveled host path data and a dynamically built rear road map to determine relative lane offset by: (1) identifying a lane polynomial within the built rear road map; (2) executing a piecewise linearization of that polynomial; and (3) analytically solving a minimum distance of a target to the linearized lane polynomial. The EOCM then considers a number of 'lane widths' the target's minimum distance is from this built map (e.g., two lane widths to port may translate to target is in 2nd left adjacent lane). The analysis carried out at subroutine block 117 may be supplemented by Kalman-corrected data output from process blocks 119, 121 and 123, which will be described in further detail below.

Using the sensor data of block 105 and the vehicle dynamics data of block 107, supplemented with closed-loop feedback from KALMAN PREDICTION block 125, method 100 executes a TRACK ASSOCIATION subroutine block 119 to track target vehicle movement and concomitantly associate incoming sensor data with tracked targets. Target tracking may include detecting, locating, and monitoring motion of a single target for multiple time samples or concurrently monitoring motion of multiple targets for multiple time samples. Once a target is detected, for example, incoming measurements are taken by the in-vehicle sensor array and, wherever possible, associated with at least one existing fused track. Measurements association may be based on a comparison of current and, optionally, historical position and velocity data of an existing fused track (or simply "track" for brevity) with position/velocity data contained within the incoming sensor measurements. These incoming measurements may be associated with an existing fused track as follows: (1) identifying a detected target as an existing fused track when that target has been observed by the host vehicle's target acquisition system for a predefined extended period (e.g., detected by at least one sensor for at least N cycles over a predefined window of time); (2) predicting an observed existing fused track's position forward one time step; and (3) aligning the track with new incoming measurements at that forward time step. New measurement alignment may include analyzing the measurements' position and velocity information, comparing it to the existing track's position and velocity, and if sufficiently similar (e.g., within at least a standard deviation of each other), consider the measurement to be assigned/associated with the existing track. This process may then be repeated for each subsequent time step.

Method 100 advances from subroutine block 119 to TRACK UPDATE subroutine block 121 to filter the real-time target tracking data and compare the filtered data to prior-derived estimates in a closed-loop comparison, e.g., in order to update status information for each existing fused track. This status data may include details like width, type, confidence, etc. An existing fused track that continues to associate with new incoming measurements may be deemed to "mature", whereas tracks that are not associated with new incoming measurements may be deemed to "lose maturity" until they are eventually "destroyed" after not associating for a predefined number of cycles. The status of an existing track may be updated by: (1) identifying status data within a new set of incoming measurements; (2) attempting to assign measurement status data to a track by correlating with that track's existing status data; and (3) if assigned, updating the track's status. The status of a track may be updated to mature in response to the track associating with new measurements over several time steps. On the other hand, when a track is not confirmed with new measurements in a future time step, a confidence level in the status of that track, if still observable by the system, may be reduced and the track may be labelled as "immature". The track is eventually destroyed and no longer tracked in future time steps after a predefined number of cycles of not being associated with new measurements.

Upon completion of the track association procedures contained within subroutine 121, a KALMAN CORRECTION subroutine block 123 is carried out to reduce sensor noise in system measurements. Once a track is associated with a measurement, for example, the track's state variables, such as position, headway, velocity, trajectory, etc., may be estimated based on statistical noise of the current track variables and statistical noise of the incoming measurement variables. Track variables may include state variables such as lateral position, longitudinal position, lateral velocity, longitudinal velocity, etc. By way of contrast, track parameters, such as target width, target length, target type, etc., may be directly assigned to a track as they do not change over successive time steps and, thus, likely do not require filtering. For instance, a track variable such as lateral position may be considered a probabilistic estimation of a true lateral position when measured by sensors, e.g., with the understanding that no sensor is 100% accurate at all times under all conditions. This estimation may be assumed to have a random error that can be characterized, for example, by a Gaussian-type normal distribution. As a consequence, the variables have a mean (the measured value) and a covariance (the standard deviation or covariance). Statistical noise may be typified as unexplained variability within a data sample that may be minimized through KF techniques.

The filtered measurements output from the correction subroutine 123 may be passed to LANE ASSIGNMENT subroutines 117 and 127, described above and below, and to a KALMAN PREDICTION subroutine block 125 in order to forecast future target behavior. After the track statuses are updated by the TRACK UPDATE and the state variables are updated by the KALMAN CORRECTION, for example, a Kalman prediction step estimates one or more future state variables at a next time step. This prediction may be temporally aligned with incoming measurement data at the next time step. In a simplified example, if a target vehicle is 10 m away from a host vehicle and moving at 20 m/s faster than the host, the system may estimate that the target will be approximately 30 meters (m) away from the host one second in the future. This allows the system to measure the target at 10 m away and estimate the target at 20 m away 0.5 second later, 30 m away 1.0 second later, and so on, with the understanding that it is the same target across the various time steps. This, in turn, enables the host vehicle's target acquisition system to persistently track a target over several time steps, which then allows the system to gather additional information and confidence about a detected target.

With continuing reference to FIG. 2, the method 100 advances to a MAP BASED ABSOLUTE LANE ASSIGNMENT subroutine block 127 that linearizes a lane polynomial locally around a target object, e.g., to efficiently and effectively localize the target within a complex mapped environment. A map-based absolute lane assignment may be performed by calculating a piecewise linearized road map as:

$$y = y_0 + mx$$
$$m = \frac{(y_2 - y_1)}{(x_2 - x_1)} = \frac{(y_1 - y_0)}{x_1}$$
$$y_0 = y_1 - mx_1$$

where:
x=longitudinal position with respect to geometric center of host vehicle;
y=lateral position with respect to geometric center of host vehicle;
$y_0$=y-intercept of the piecewise linear representation of the lane polynomial;
m=slope of piecewise linear representation of the lane polynomial;
$x_1$=longitudinal position of the lower boundary of the piecewise linearized road map segment;
$x_2$=longitudinal position of the upper boundary of the piecewise linearized road map segment;
$y_1$=lateral position of the lower boundary of the piecewise linearized road map segment; and $y_2$=lateral position of the upper boundary of the piecewise linearized road map segment.

After calculating the piecewise linearized road map, a lateral distance between a target and the linearized road map may be calculated as:

$$S^2 = (x - x_t)^2 + (y_0 + mx - y_t)^2$$

$$\frac{(S^2)'}{2} = 0 \rightarrow x - x_t + m(y_0 + mx - y_t) = 0$$

$$x_{min} = \frac{x_t + m(y_t - y_0)}{(1 + m^2)^2}$$

$$y_{min} = y_0 + mx_{min}$$

$$LateralOffset = \sqrt{(x_{min} - x_r)^2 + (y_{min} - y_t)^2}$$

where $x_t$=longitudinal position of the target vehicle;
$y_t$=lateral position of the target vehicle;
S=parametric distance between target vehicle and a point along the piecewise linearized road map segment;
$x_{min}$=longitudinal position of the point along the piecewise linearized road map segment that is the minimum distance to the target vehicle;
$y_{min}$=lateral position of the point along the piecewise linearized road map segment that is the minimum distance to the target vehicle; and
$L_{Offset}$=lateral offset of a target vehicle to a lane polynomial.

Figure 3:
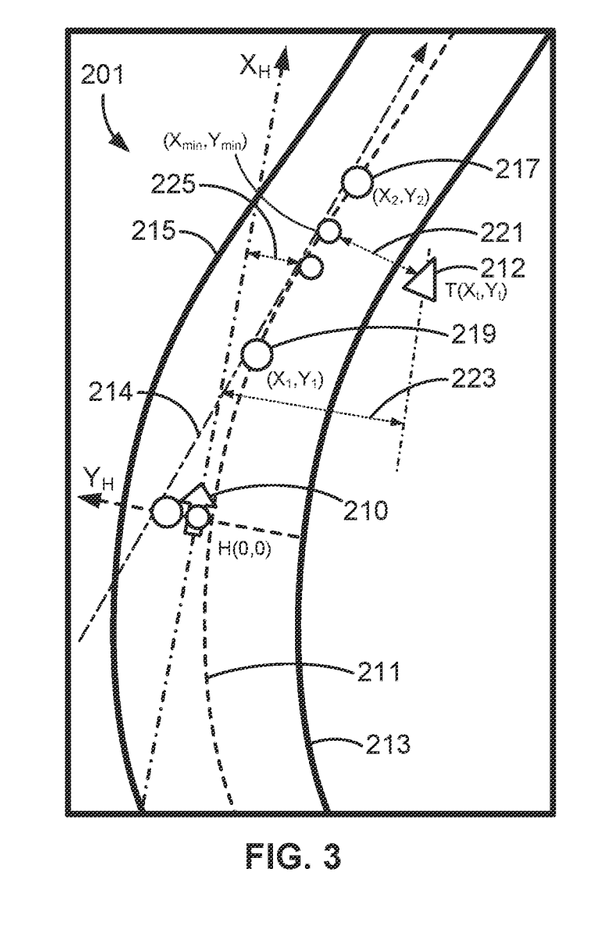
FIG. 3 is a schematic, plan-view illustration of a representative host vehicle conducting piecewise linearized road mapping and target lateral distancing for map-based absolute lane assignment in accord with aspects of the disclosed concepts.

The host to linearized map distance may be projected to a Yh axis=$y_0$+$mx_t$. An example of a piecewise linearized road map, a lateral distance from a target to a host, and a lateral distance from a target to a calculated road map are illustrated in FIG. 3.

As part of the MAP BASED ABSOLUTE LANE ASSIGNMENT procedure 127, the system may also assess whether or not a detected target has breached a lane line of a host lane of the host vehicle. This may include calculating a lateral offset as:

$$|L_{Offset}| - \frac{T_W}{2} < \frac{L_W}{2} \;\&\&\; |L_{Offset}| > \frac{L_W}{2}$$

In response to such a breach, the system may determine a percentage of the target vehicle within the host lane by calculating:

$$\frac{\frac{L_W + T_W}{2T} - L_{offset}}{T_W}$$

where $L_W$=lane width; and
$T_W$=target width.

The system may then dynamically reclassify a target to the host lane as a function of longitudinal offset:

$$y = \frac{y_1(x_2 - x) + y_2(x - x_1)}{x_2 - x_1}$$

Figure 4A:
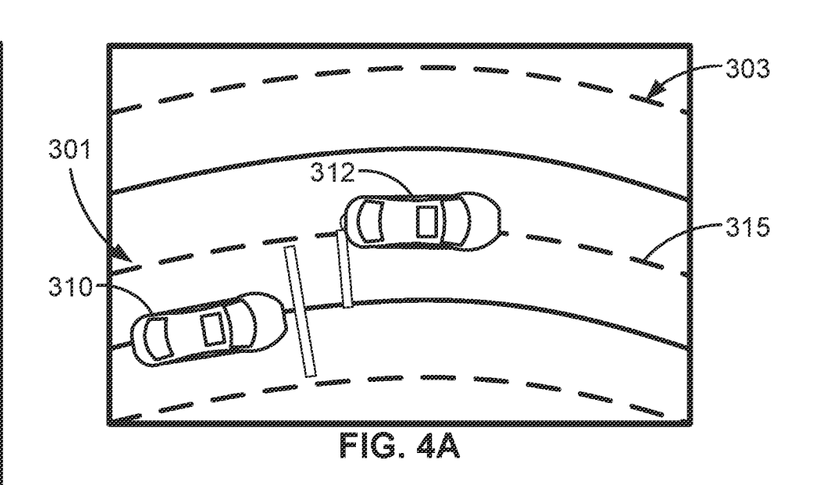
FIGS. 4A and 4B are schematic, plan-view illustrations of a representative host vehicle conducting target vehicle lane intrusion and cut-in prediction for map-based absolute lane assignment in accord with aspects of the disclosed concepts.
Figure 4B:
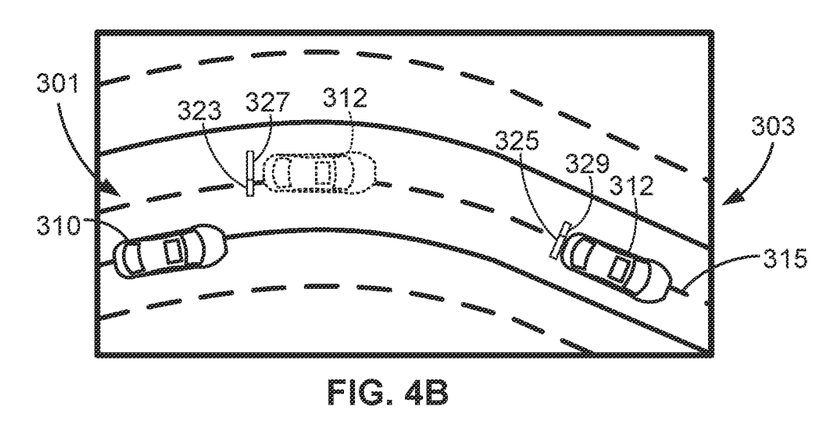

An example of target lane intrusion forecasting, including lane line breach and percent of breach estimates, is illustrated in FIGS. 4A and 4B.

At LANE ASSIGNMENT ASSESSOR subroutine block 129, the multiple available methods of target lane estimation—sensor-based lane estimation (block 115), vehicle path/dynamics-based lane estimation (block 117), map-based lane estimation (block 127), etc.—are aggregated and analyzed to provide a "best estimate" of a target's lane assignment. The system attempts to utilize the most relevant and most accurate information available at a given point in time under a given set of circumstances to localize a target. For instance, when there is no map data for a subject road segment, the system may defer to sensor-based and/or dynamics-based estimates for an accurate and trustworthy target lane assessment. Comparatively, for instances in which insufficient or inconsistent historical data is available for vehicle path-based estimation, the system may defer to sensor-based and/or map-based estimates. Where all methods of estimation are available, the system may look for overlapping estimates or multiple estimates within a predefined range of consistency to identify a best estimate.

Upon completion of subroutine 129, the method 100 proceeds to TRACK OUTPUT data block 131 to convert fusion data structures, e.g., in order to facilitate a desired driving maneuver or a set of desired driving maneuvers in response to the localized target(s). In the data fusion processes described above, data may be handled as an array of structures, where each location of the array is a discrete structure that contains respective track information. TRACK OUTPUT may convert the array structure to discrete arrays with individual segments of track information. By way of example, accessing a first track longitudinal position for an advanced auto steer (AoS) maneuver may be typified as: Track[1].PositionX. To access the same information in an individual array, the first track longitudinal position may be defined as: PositionX[1].

After updating the object map and completing track output tasks, the method 100 advances to THREAT SELECTION/MISSION PLANNING process and output block 111 and sorts the detected objects into relevant groups based upon different automated features and establishes a response protocol for any selected threats. To select a threat, for example, the system may filter a list of detected objects within a predetermined proximity of the host vehicle, determine which one or ones are nearest ahead in the host path, and whether or not the nearest track(s) are likely to interfere with the host vehicle. Mission planning then takes each tracked target object "threat" and constructs a plan for the host vehicle trajectory that mitigates the likelihood of interference of the threat with the object. A mission planning algorithm within a route planning module of an automated driving system may derive a desired trajectory with a set of lane centering and lane change maneuvers in conjunction with a desired output of a vehicle powertrain and/or braking system. Further options may include adjacent lane object information being provided to ADAS/autonomous lane change features, whereas host lane object data may be provided to ACC and CAS features.

With reference next to FIG. 3, there is shown a schematic illustration of a representative host vehicle (arrow 210) that is constructing a piecewise linearized road map and assessing a target lateral distance as part of a map-based absolute lane assignment procedure. In this Figure, a lane center 211 of a host lane 201 is shown with a curved dashed line, whereas left and right lane boundaries 213 and 215, respectively, are shown with curved solid lines. A target vehicle (triangle 212) is shown adjacent to the host lane 210 (e.g., within an adjacent "parallel" lane or in a highway on ramp). Fore and aft end points 217 and 219 demarcate a piecewise linearization 214 of a lane polynomial localized around the target 212 and superimposed over a corresponding segment of a road map. A lateral offset 221 between the target 212 and linearized road map 214 may be designated as a minimum offset distance for the target vehicle 212 to the lane center 211. Comparatively, a lateral distance 223 between the host 210 and target 212 may be derived by the in-vehicle sensor array. Also shown in FIG. 3 is a lateral distance 225 that designates the distance of the host vehicle 210 to the linearized map 214 as projected from an $X_H$ axis to a $Y_H$ axis.

FIGS. 4A and 4B illustrate a representative host vehicle 310 conducting a target lane intrusion and cut-in prediction procedure for a map-based absolute lane assignment protocol. In the illustrated example, a target vehicle 312 is in the process of exiting a target lane 303 and cutting into a host lane 301 of the host vehicle lane 310. In FIG. 4A, the host 310 uses fused map and sensor data to determine if the target 312 is crossing a lane line 315, e.g., based on a target width, a lane width, and a calculated lateral offset. After confirming the target vehicle 312 has crossed the lane line 315, the host vehicle 310 estimates the percentage of the target's width that is within the host lane 301. In FIG. 4B, a first estimated percent of target width in the host lane 301 is portrayed in segments 323 and 325, and a second estimated percent of target width outside the host lane portrayed in segments 327 and 329. The host 310 may then perform an interpolation of estimated percent within the host lane, e.g., against a lookup table, to determine whether or not to reclassify the target lane as the host lane.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol, or method disclosed herein may be embodied as software stored on a tangible medium such as, for example, a flash memory, a solid-state drive (SSD) memory, a hard-disk drive (HDD) memory, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms may be described with reference to flowcharts and/or workflow diagrams depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method for controlling operation of a motor vehicle, the method comprising:
    receiving, via an electronic controller from a sensor array mounted to the motor vehicle, sensor data indicative of target dynamics information for a target vehicle;
    estimating, via the electronic controller using the sensor data from the sensor array, a predicted lane assignment for the target vehicle on a road segment of the motor vehicle;
    receiving, via the electronic controller from a memory-stored map database, map data indicative of roadway information of the road segment;
    fusing the sensor data with the map data to construct a polynomial overlay for a host lane of the road segment across which travels the motor vehicle;
    constructing a piecewise linearized road map of the host lane of the road segment;
    combining the piecewise linearized road map with the predicted lane assignment and the polynomial overlay to determine a calculated lane assignment for the target vehicle; and
    controlling, via the electronic controller, a resident vehicle system of the motor vehicle to execute a control operation using the calculated lane assignment for the target vehicle, the control operation including braking, steering, and/or acceleration of the motor vehicle.

2. A motor vehicle, comprising:
    a vehicle body;
    a plurality of road wheels attached to the vehicle body;
    a prime mover attached to the vehicle body and configured to drive one or more of the road wheels to thereby propel the motor vehicle;
    a sensor array mounted to the vehicle body; and
    a vehicle controller operatively connected to the sensor array, the vehicle controller being programmed to:
        receive, from the sensor array, sensor data indicative of target dynamics information for a target vehicle;

estimate, using the received sensor data, a predicted lane assignment for the target vehicle on a road segment of the motor vehicle;

receive, from a memory-stored map database, map data indicative of roadway information of the road segment;

fuse the sensor data with the map data to construct a polynomial overlay for a host lane of the road segment across which travels the motor vehicle;

construct a piecewise linearized road map of the host lane of the road segment;

combine the piecewise linearized road map with the predicted lane assignment and the polynomial overlay to determine a calculated lane assignment for the target vehicle; and control a resident vehicle system of the motor vehicle to execute a control operation using the calculated lane assignment for the target vehicle, the control operation including braking, steering, and/or acceleration of the motor vehicle.

3. The method of claim 2, wherein constructing the piecewise linearized road map further includes calculating a lateral distance between the target vehicle and the piecewise linearized road map including:

$$S^2 = (x - x_t)^2 + (y_0 + mx - y_t)^2$$

$$\frac{(S^2)'}{2} = 0 \rightarrow x - x_t + m(y_0 + mx - y_t) = 0$$

where S is a parametric distance between the target vehicle and a designated point along the piecewise linearized road map segment; $x_t$ is a fourth longitudinal position of the target vehicle; and $y_t$ is a fourth lateral position of the target vehicle.

4. The method of claim 3, wherein calculating the lateral distance between the target vehicle and the piecewise linearized road map further includes:

$$x_{min} = \frac{x_t + m(y_t - y_0)}{(1 + m^2)^2}$$

$$y_{min} = y_0 + mx_{min}$$

$$L_{Offset} = \sqrt{(x_{min} - x_t)^2 + (y_{min} - y_t)^2}$$

where $x_{min}$ is a fifth longitudinal position of a point along the piecewise linearized road map segment that is a minimum distance to the target vehicle; $y_{min}$ is a fifth lateral position of the point along the piecewise linearized road map segment that is the minimum distance to the target vehicle; and $L_{offset}$ is a lateral offset of the target vehicle to a lane polynomial.

5. The method of claim 1, further comprising:

designating the target vehicle as an existing fused track responsive to the sensor array detecting the target vehicle for at least a predefined minimum number of tracking cycles;

receiving, from the sensor array, real-time measurements of target vehicle movement; and associating a subset of the real-time measurements from the sensor array with the existing fused track based on a comparison of target vehicle position and/or velocity data of the target vehicle with position and/or velocity data contained in the real-time measurements.

6. The method of claim 5, further comprising:

estimating a set of state variables for the existing fused track based on statistical noise within a set of current track variables and statistical noise within a set of incoming measurement variables; and determining a corrected set of state variables by filtering the set of state variables with a Kalman Filter.

7. The method of claim 6, further comprising estimating a future set of state variables for the existing fused track at a next time step using the corrected set of state variables.

8. The method of claim 1, further comprising:

determining if the target vehicle has breached a lane line of the host lane;

determining, in response to a determination that the target vehicle breached the lane line, a breach percentage of the target vehicle within the host lane of the motor vehicle; and dynamically reclassifying the calculated lane assignment of the target vehicle to the host lane as a function of the breach percentage.

9. The method of claim 1, wherein the target dynamics information includes a target location, a target distance, and a target velocity of the target vehicle.

10. The method of claim 9, further comprising receiving, via the electronic controller from the sensor array, lane line data for the host lane of the road segment, wherein estimating the predicted lane assignment for the target vehicle includes comparing the target dynamics information and the lane line data.

11. The method of claim 1, wherein receiving the map data includes:

receiving real-time global positioning system (GPS) coordinate data for the motor vehicle; and translating, using the real-time GPS coordinate data, road-level data and lane-level data contained in the map data to a host reference frame of the motor vehicle.

12. The method of claim 1, wherein the resident vehicle system includes an autonomous driving control module operable to automate driving of the motor vehicle, the control operation including automating driving of the motor vehicle to complete a driving maneuver based on the calculated lane assignment for the target vehicle.

13. The method of claim 1, wherein the resident vehicle system includes an Advanced Driver Assistance System (ADAS) control module operable to automate control of the motor vehicle, the control operation including executing a braking, steering, and/or acceleration maneuver based on the calculated lane assignment for the target vehicle.

14. The method of claim 1, wherein the resident vehicle system includes a vehicle navigation system with a display device, the control operation including displaying, via the display device, an indication of the target vehicle within proximity of the motor vehicle and an indication of the calculated lane assignment for the target vehicle.

15. A motor vehicle, comprising:

a vehicle body;

a plurality of road wheels attached to the vehicle body;

a prime mover attached to the vehicle body and configured to drive one or more of the road wheels to thereby propel the motor vehicle;

a sensor array mounted to the vehicle body; and a vehicle controller operatively connected to the sensor array, the vehicle controller being programmed to:

receive, from the sensor array, sensor data indicative of target dynamics information for a target vehicle;

estimate, using the received sensor data, a predicted lane assignment for the target vehicle on a road segment of the motor vehicle;

receive, from a memory-stored map database, map data indicative of roadway information of the road segment;

fuse the sensor data with the map data to construct a polynomial overlay for a host lane of the road segment across which travels the motor vehicle;

construct a piecewise linearized road map of the host lane of the road segment;

combine the piecewise linearized road map with the predicted lane assignment and the polynomial overlay to determine a calculated lane assignment for the target vehicle; and control a resident vehicle system of the motor vehicle to execute a control operation using the calculated lane assignment for the target vehicle, the control operation including braking, steering, and/or acceleration of the motor vehicle.

16. The motor vehicle of claim 15, wherein the vehicle controller is further programmed to:

designate the target vehicle as an existing fused track responsive to the sensor array detecting the target vehicle for at least a predefined minimum number of tracking cycles;

receive, from the sensor array, real-time measurements of target vehicle movement; and associate a subset of the real-time measurements from the sensor array with the existing fused track based on a comparison of target vehicle position and/or velocity data of the target vehicle with position and/or velocity data contained in the real-time measurements.

17. The motor vehicle of claim 16, wherein the vehicle controller is further programmed to:

estimate a set of state variables for the existing fused track based on statistical noise within a set of current track variables and statistical noise within a set of incoming measurement variables; and determine a corrected set of state variables by filtering the set of state variables with a Kalman Filter.

18. The motor vehicle of claim 17, wherein the vehicle controller is further programmed to estimate a future set of state variables for the existing fused track at a next time step using the corrected set of state variables.

19. The motor vehicle of claim 15, wherein the vehicle controller is further programmed to:

determine if the target vehicle has breached a lane line of the host lane;

determine, in response to a determination that the target vehicle breached the lane line, a breach percentage of the target vehicle within the host lane of the motor vehicle; and dynamically reclassify the calculated lane assignment of the target vehicle to the host lane as a function of the breach percentage.

20. The motor vehicle of claim 15, wherein the resident vehicle system includes an Advanced Driver Assistance System (ADAS) control module operable to automate control of the motor vehicle, the control operation including executing a braking, steering, and/or acceleration maneuver based on the calculated lane assignment for the target vehicle.

* * * * *